Patented Mar. 8, 1927.

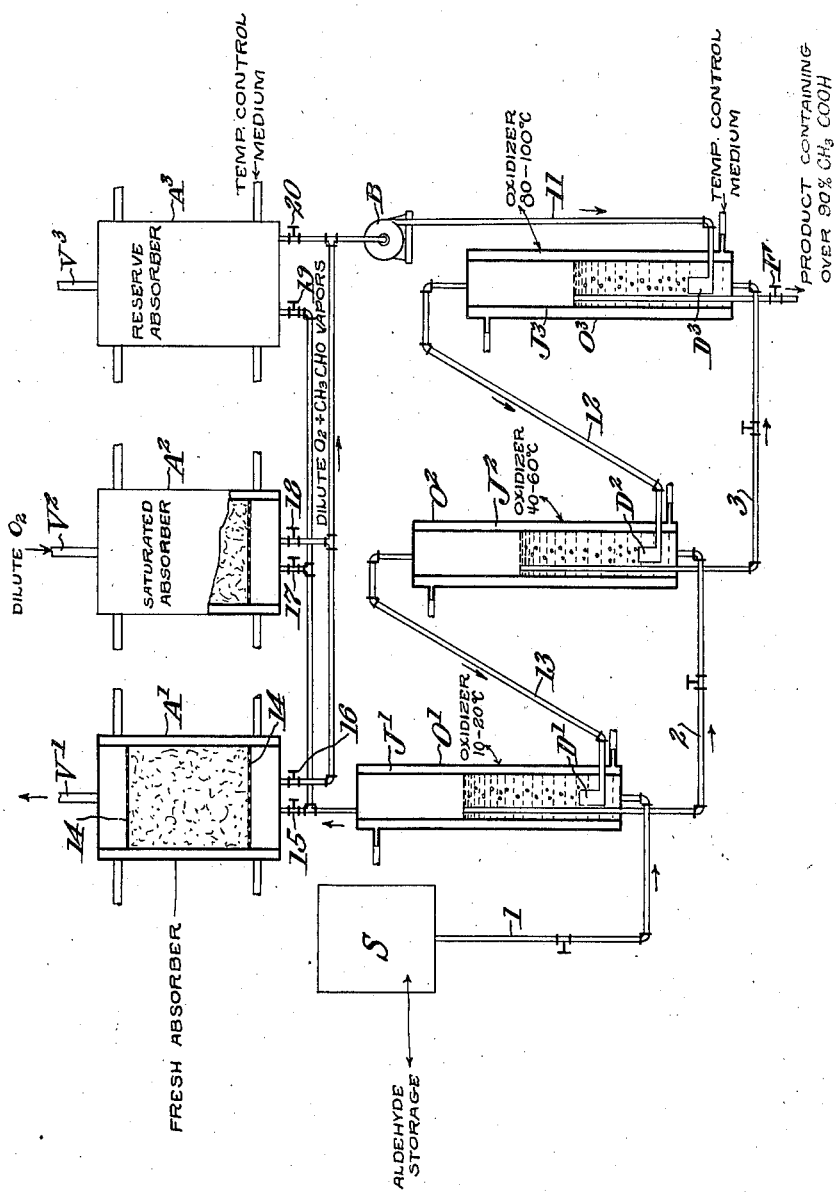

1,620,180

UNITED STATES PATENT OFFICE.

CHARLES O. YOUNG, OF ELMHURST, NEW YORK, AND CLARENCE J. HERRLY, OF PITTSBURGH, PENNSYLVANIA, ASSIGNORS TO CARBIDE AND CARBON CHEMICALS CORPORATION, A CORPORATION OF NEW YORK.

PROCESS AND APPARATUS FOR CONDUCTING CHEMICAL REACTIONS.

Application filed June 20, 1923. Serial No. 646,593.

This invention relates to processes and apparatus for carrying out chemical reactions in which gases or vapors from the reaction zone are passed through an absorbent. A particular object of the invention is improvements in the absorption and recirculation of substances carried by effluent gases or vapors.

In the following specification and claims references to absorption are to be understood as including any method of fixation of material in recoverable form, whether by adsorption or other physical action, or by formation of chemical compounds. Also, the words "gas" and "gaseous" are used broadly with reference to all aeriform fluids, including those frequently called vapors.

In many processes in which gases are passed over or through a charge, the effluent gases contain material which would have an advantageous effect if returned to the reaction chamber. Such material may be either a reaction product which might well be added to that in the system, or a residual gas capable of further reaction. Processes of the general nature referred to are especially frequent in the oxidation, chlorination, esterification, or other treatment of organic compounds, under conditions such that not all of the reagent gas is absorbed, or in which the reagent gas has non-reactive components. The resulting products are often relatively volatile at the temperatures employed and are carried out in material quantities with the effluent gas. It has heretofore been proposed either to work in a closed system, which is conveniently applicable in a limited number of cases only, or to absorb the valuable portion of the effluent gas in solid or liquid material, from which it must be recovered by procedure distinct from that involved in the reaction process itself.

The present invention resides in the provision of a reaction and absorption system in which valuable material carried by evolved gases is returned to the process as an incident to its normal operation. In this manner substantially improved yields and other advantages are obtained without in any way interrupting the process. The preferred procedure comprises the absorption in a suitable medium of valuable material carried by the reagent gas, and the return of such material to the system by causing the entering reagent gas to remove it from the absorbent.

The invention will be further described with specific reference to one process to which it may be advantageously applied, that is, the manufacture of acetic acid by oxidizing acetaldehyde with oxygen containing gas mixtures. It is to be understood, however, that the invention is not limited to any particular reaction.

It has been known that acetaldehyde could be oxidized to acetic acid by the use of substantially pure oxygen, but attempts to substitute air for pure oxygen in the process have not been industrially successful, so far as we are aware. A serious obstacle encountered in the use of air is the loss from the reaction vessel of much aldehyde, which is carried over by the nitrogen of the air used. Such additions to the apparatus as have been proposed for the recovery of the aldehyde thus carried off have been elaborate and expensive, yet apparently have not functioned satisfactorily.

An object of our invention is the use of air or other similarly dilute oxygen mixture in the process referred to above. A principal feature of our invention consists in passing the exit gases from the reaction vessel through material adapted to absorb any aldehyde or acetic acid contained in the gases, and in periodically changing the course of the gases so that fresh oxidizing mixture, for example air, will pass on its way to the reaction vessel through absorbent more or less saturated with aldehyde and acid, while the exit gases from the reaction vessel will pass through another portion of absorbent still capable of taking up the substances mentioned.

An embodiment of the invention will now be described in connection with the drawing, which shows diagrammatically a suitable arrangement of apparatus.

The oxidation is carried out principally with the aldehyde in liquid phase, and while it is contained in the oxidizers $O^1$, $O^2$ and $O^3$. A mixture of aldehyde and acid flows through the series of oxidizers, the most concentrated aldehyde being fed to $O^1$ from supply tank S, and the final product, high in acetic acid, being drawn off at F. The supply tank and oxidizers may be placed at different levels, as shown, so that liquid flows through the system by gravity, but pumps or the like may of course be substituted for gravity flow. In the arrangement illustrated, aldehyde is fed to $O^1$ through pipe 1. When the liquid level in $O^1$ reaches a certain height, it overflows through pipe 2 to $O^2$, liquid from $O^2$ overflowing in similar fashion to $O^3$ through pipe 3. It will be understood that all the pipes are provided with suitable valves to control the flow of liquid through the system.

The air or the like flows through the system in the opposite direction, entering $O^3$ through pipe 11 and being very finely divided by diffusor $D^3$. The oxygen not consumed in $O^3$, together with the inert gases originally associated with the oxygen, pass out the top of $O^3$ through pipe 12 to the bottom of $O^2$, where there is a second diffusor $D^2$. By means of similar pipe 13 and diffusor $D^1$, the waste gases from $O^2$ are passed to $O^1$.

The oxidizers are provided respectively with jackets $J^1$, $J^2$ and $J^3$, having suitable inlet and outlet connections, so that each oxidizer may be maintained at any desired temperature by the circulation of a heating or cooling medium through its jacket. The temperatures of the several oxidizers are so controlled that aldehyde is present in each, permitting oxidation to occur in each oxidizer. The temperatures and other factors are so controlled that the liquid discharged at F is acetic acid of the desired concentration.

In one run of an apparatus comprising three oxidizers, the oxidizer into which the pure aldehyde was introduced was kept at 10°–20° C., the next oxidizer was held at 40°–60° C., while the last of the series was maintained at 80°–100° C. Aldehyde was fed to the oxidizer having the lowest temperature at such a rate that the concentration of aldehyde therein was above 50%. In the next oxidizer, the acid concentration rose to about 80%, while the final product contained more than 90% of acetic acid. The increase in acetic acid concentration which occurred in the two oxidizers having elevated temperatures was due in part to oxidation of acetaldehyde in them, but was chiefly due to volatilization from these heated vessels. It will be understood that the process may be so conducted that the final product will contain a lower percentage of acetic acid, the aldehyde being removed from this product, if desired, in a supplementary apparatus, such as a continuous still.

The exit gases leaving $O^1$ will contain considerable acetaldehyde, and usually some acetic acid. In accordance with our invention, these products are recovered from the gases by passing the latter through charcoal, silica gel, or other solid or liquid absorbent. In our experiments we have used, with excellent results, a variety of charcoal produced by low temperature calcination and subsequently treated at elevated temperatures with an oxidizing gas, such as steam. This material, now generally known as activated carbon, will absorb about 30% of its weight of acetaldehyde at 10°–20° C., practically no aldehyde escaping absorption up to this degree of saturation.

In the apparatus illustrated, the solid absorbent is contained in the jacketed absorbers $A^1$, $A^2$ and $A^3$, of conventional construction. The absorbent is held between foraminous partitions 14. Suitable connections to the jackets of the absorbers permit their temperatures to be controlled by circulation of such media as steam or water.

A number of absorbers are preferably used and such piping and valves are provided that the gases from $O^1$ can be passed to any desired absorber or absorbers. The absorbers are also so arranged that air may be drawn in through absorbent which is more or less saturated, removing valuable material, the air then passing to the oxidizers for the recovery of the aldehyde and acid taken up from the absorbent. Thus, in the arrangement illustrated, when valve 15 is open and valves 16, 17 and 19 are closed, the gases from $O^1$ will pass through absorber $A^1$, escaping from $V^1$ after their values have been removed. Assuming that $A^2$ contains saturated absorbent, valves 16 and 20 may be closed and valve 18 open, and air will be drawn in through $V^2$ and absorber $A^2$ by blower B, and will pass to oxidizer $O^3$ and thence to the other oxidizers in series.

With the gas flow in the course just indicated, absorber $A^1$ is preferably cooled to promote absorption, while absorber $A^2$ is heated to promote expulsion of previously absorbed material. Such heating may be applied by means of a steam jacket or the like, but it is frequently desirable to use the incoming reagent gas, suitably preheated, as the source of heat. If materials of low heat conductivity, such as carbon, are used, it is difficult to raise the inner portions to the proper temperature by external heat.

Only two of the three absorbers are actually in use, $A^3$ being held in reserve. The absorbers need not be pushed to complete saturation, nor to complete expulsion of absorbed material when the gas current is reversed. The absorbing and expelling steps constitute a cycle controlled by a simple manipulation of valves, and the two operations can be restricted to the periods wherein the absorbent behaves most favorably.

The invention is not limited to any particular absorbent. Charcoal, silica gel, glacial acetic acid, or other solid or liquid material may be used. In general we prefer to use activated carbon.

It may frequently happen that reaction takes place in the absorbers, the reaction products being absorbed as formed. This is especially the case when substances having a rather wide range of catalytic activity, such as charcoal or silica gel, are used as the absorbent. Thus many organic compounds may be oxidized by air or oxygen in the presence of charcoal, and the resulting product may constitute a valuable addition to that formed by the main reaction in liquid phase, as carried out in the present system. This catalytic function is additional to that of absorption and does not interfere with the latter.

In the process particularly described above, some oxidation of aldehyde may take place while the aldehyde is held by the absorbent, and there may be some oxidation as the aldehyde is carried by gases from one vessel to another. Most of the oxidation, however, appears to occur in the liquid phase of the aldehyde.

A special advantage of reaction in the absorbers is obtained in the regeneration of reagent gases. Methods involving reduction of nitrogen tetroxid or sulfur trioxid, for example, fall within this class. In the presence of oxygen and under proper temperature conditions, nitric oxid and sulfur dioxid are converted in contact with absorbents such as charcoal to the tetroxid and trioxid. These compounds are held by the charcoal and may be swept back into the system by a current of air or other gas containing the requisite additional reagents, the temperature of the absorbent being suitably elevated to facilitate displacement of absorbed material. In prior methods residual reduced gases of acid character are absorbed in alkali, the resulting salt is decomposed, and the gaseous product is reoxidized, if necessary, for further use. The advantages of the present method, as compared with such prior methods, are obvious.

Among the other processes to which the present invention is applicable, is the chlorination of olefins with chlorine or other suitable chlorinating agent. The gases passing from the chlorinating chamber usually contain olefin and hydrogen chlorid resulting from side reactions, and the reaction product, for example ethylene dichlorid, which latter must be removed before recirculating the effluent gas. By means of an absorption system of the general type described this can be readily accomplished. The absorbers may contain activated carbon, which readily absorbs ethylene dichlorid. The residual olefin-containing gas, after removal of any remaining hydrogen chlorid, passes to the gas holder. When the absorbed material is to be removed, the incoming stream of reagent gas, or a portion of it, is sent through the absorber. The gas should be preheated or the temperature of the absorber suitably raised in some other manner. A condenser is interposed between the absorber and the reaction system to remove ethylene dichlorid or other chlorinated reaction products. Since the condensation takes place more readily when the concentration of the dichlorid is relatively high, it is desirable to use only a portion of the reagent gas as the expulsion means. The principle here indicated of removing the absorbed material at a point intermediate the absorber and reaction chamber will of course be applied in all cases where such material would be detrimental if re-introduced into the system.

Various other processes may be carried out advantageously by the present method. Among these may be mentioned the oxidation of certain aldehydes to acids, or alcohols to aldehydes or ketones, using air or other oxygen-containing gas. More specifically, butyraldehyde may be oxidized to butyric acid in this way, or ethyl alcohol to acetaldehyde, isopropyl alcohol to acetone, or methyl alcohol to formaldehyde, preferably using activated carbon as the absorbent in each case.

When certain reagent gases are used, for instance chlorin, materials such as activated carbon may take up substantial amounts of the gas, as well as reaction products. No difficulty generally arises from this fact, however, owing to the selective absorption exerted by the carbon. The reaction products, usually substances of more complex constitution and greater molecular weight than the reagent gas, are generally taken up and retained more readily than that gas. When the temperature of the absorber is raised, and the incoming stream of reagent gas is passed through it, the reaction products will be swept back into the system, notwithstanding their relatively stable absorption in the carbon.

While the system of reaction chambers illustrated is advantageous for the oxidation of acetaldehyde and similar reactions, the number and form of these chambers may be varied to suit particular conditions. For example, the chambers may be connected compartments bounded by horizontal partitions in a single vertical column, and maintained at progressively increasing temperatures toward the foot of the column. Such an apparatus closely resembles a vertical still having provision for the passage of air therethrough. The arrangement of the reaction and absorption system may also be modified as desired, so long as connections between the absorber or absorbers and the reaction zone permit the absorption and recovery of material in substantially the manner described. Continuous operation is generally desirable and a plurality of absorbers will therefore usually be provided. The number and form of the absorbers may, however, be modified in any suitable way in accordance with the character of the absorbent and the requirements of the process to be carried out in the system.

The present case is a continuation-in-part of our copending application Serial No. 630,349, filed April 6, 1923.

We claim:

1. Process of conducting chemical reactions, comprising the carrying on of chemical reactions in a reaction zone, alternately passing effluent gases from said reaction zone through activated carbon to absorb materials contained in said gases and removing such materials from said activated carbon by a current of reagent gas passing to said reaction zone.

2. Process of conducting chemical reactions involving the circulation of a reagent gas, comprising passing such gas through a zone wherein reaction is effected, thence passing the remaining gas through activated carbon to absorb materials therefrom, discontinuing the passage of the gas when the activated carbon is sufficiently charged with such materials, and passing at least a portion of the incoming reagent gas through said activated carbon under conditions such that absorbed material may be removed therefrom.

3. Process of continuously conducting chemical reactions involving the circulation of a reagent gas, comprising passing such gas through a zone wherein reaction is effected, thence passing the gas through a body of activated carbon to absorb valuable materials therefrom, diverting the gas, when the activated carbon is sufficiently charged with such materials, to another body of activated carbon, passing the incoming reagent gas through the charged activated carbon under conditions such that absorbed materials may be removed therefrom and returned to the reaction system, and periodically reversing the flow of gas through the bodies of activated carbon as they become charged with valuable material.

4. Process of oxidizing acetaldehyde to acetic acid which comprises establishing a series of bodies of liquid containing acetic acid, maintaining said bodies of liquid at progressively increasing temperatures, all said temperature being below the boiling point of acetic acid, passing dilute oxygen through said bodies of liquid in the direction of decreasing temperatures, transferring liquid from each body to a body of higher temperature, adding acetaldehyde to the coolest body of liquid, and recovering acetic acid from the hottest body.

5. Process of oxidizing acetaldehyde to acetic acid which comprises maintaining a series of bodies of liquid comprising acetaldehyde and acetic acid, the temperatures of said bodies of liquid increasing progressively through the system, passing liquid from each body of liquid to a body of higher temperature, and passing dilute oxygen successively through the bodies of the liquid in the direction of decreasing temperatures.

6. In the process of oxidizing acetaldehyde to acetic acid by the use of dilute oxygen, the steps of bringing the dilute oxygen into contact with acetaldehyde to oxidize the latter, removing acetaldehyde from the residual gases by absorption, and then passing through the absorbent medium a gas mixture richer in oxygen than that which carried the acetaldehyde into the absorbent to expel and oxidize acetaldehyde.

7. In the process of oxidizing acetaldehyde to acetic acid by the use of dilute oxygen, the steps of bringing the dilute oxygen into contact with acetaldehyde to oxidize the latter, removing acetaldehyde from the residual gases by absorption in charcoal, and then passing through the charcoal a gas mixture richer in oxygen than that which carried the acetaldehyde into the absorbent to expel and oxidize acetaldehyde.

8. In the process of oxidizing acetaldehyde to acetic acid by the use of dilute oxygen, the steps of bringing the dilute oxygen into contact with acetaldehyde to oxidize the latter, removing acetaldehyde from the residual gases by absorption, and then heating the absorbent medium and passing through it a gas mixture richer in oxygen than that which carried the acetaldehyde into the absorbent to expel and oxidize acetaldehyde.

9. In the process of oxidizing acetaldehyde to acetic acid by the use of dilute oxygen, the steps of recovering acetaldehyde from dilute oxygen by absorption, and then blowing the acetaldehyde out of the absorbent medium with a gas containing a higher concentration of oxygen than the mixture from which the aldehyde was absorbed, and oxidizing the acetaldehyde so removed from the absorbent medium.

10. In the process of oxidizing acetaldehyde to acetic acid by the use of dilute oxygen, the steps of blowing acetaldehyde out of an absorbent material, recovering said acetaldehyde by dissolving it in a liquid containing acetic acid, and subjecting the recovered aldehyde to oxidation.

In testimony whereof, we affix our signatures.

CHARLES O. YOUNG.
CLARENCE J. HERRLY.